US012641025B2

(12) United States Patent
Duan

(10) Patent No.: US 12,641,025 B2
(45) Date of Patent: May 26, 2026

(54) DATA TRANSMISSION SYSTEM AND METHOD, AND RELATED DEVICE

(71) Applicant: Huawei Technologies Co., Ltd., Shenzhen (CN)

(72) Inventor: Qihang Duan, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 173 days.

(21) Appl. No.: 18/356,475

(22) Filed: Jul. 21, 2023

(65) Prior Publication Data

US 2023/0403232 A1 Dec. 14, 2023

Related U.S. Application Data

(63) Continuation of application No. PCT/CN2022/106309, filed on Jul. 18, 2022.

(30) Foreign Application Priority Data

Jan. 21, 2022 (CN) .......................... 202210073931.9

(51) Int. Cl.
*G06F 15/16* (2006.01)
*H04L 41/16* (2022.01)
*H04L 47/10* (2022.01)

(52) U.S. Cl.
CPC .............. *H04L 47/10* (2013.01); *H04L 41/16* (2013.01)

(58) Field of Classification Search
None
See application file for complete search history.

(56) References Cited

U.S. PATENT DOCUMENTS

| | | | | |
|---|---|---|---|---|
| 2018/0287964 | A1* | 10/2018 | Gray | ....................... H04L 12/18 |
| 2019/0205146 | A1 | 7/2019 | Patel et al. | |
| 2019/0258251 | A1* | 8/2019 | Ditty | ..................... G05D 1/0274 |
| 2020/0166977 | A1 | 5/2020 | Jayaraman et al. | |
| 2020/0410323 | A1* | 12/2020 | Vinod | ................. G06F 13/1642 |
| 2021/0103544 | A1 | 4/2021 | Guim Bernat et al. | |
| 2022/0116138 | A1* | 4/2022 | Das Sharma | ....... G06F 13/4027 |
| 2022/0121903 | A1* | 4/2022 | Zhang | ..................... G06F 15/80 |
| 2022/0351326 | A1* | 11/2022 | Rimmer | ................... G06T 1/60 |
| 2023/0004433 | A1* | 1/2023 | Kan | ........................ G06F 9/505 |
| 2023/0109990 | A1* | 4/2023 | Pappu | ....................... G06T 1/20 |
| | | | | 345/501 |

* cited by examiner

*Primary Examiner* — Phuoc H Nguyen
(74) *Attorney, Agent, or Firm* — Conley Rose, P.C.

(57) ABSTRACT

A system includes a plurality of nodes, and a plurality of accelerators in each node are connected to each other through a first communication link. A plurality of communication planes is constructed between accelerators in the plurality of nodes. Each communication plane includes one accelerator in each node. A first accelerator in a first node obtains first data sent by another accelerator in the first node, and the first data includes data to be sent by the other accelerator in the first node to a second accelerator in a second node. Then, the first accelerator sends the first data to the second accelerator through the second communication link.

27 Claims, 10 Drawing Sheets

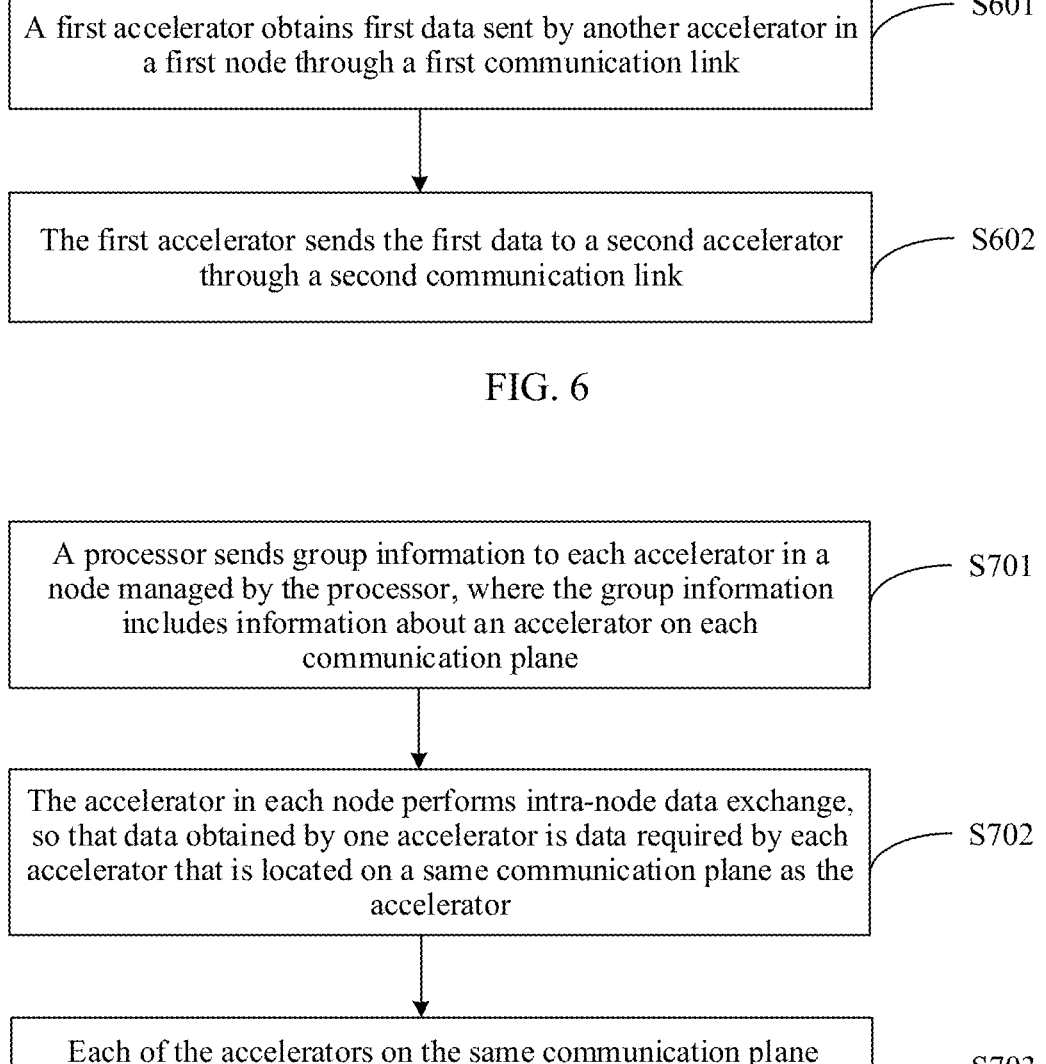

| A first accelerator obtains first data sent by another accelerator in a first node through a first communication link | S601 |

| The first accelerator sends the first data to a second accelerator through a second communication link | S602 |

FIG. 6

| A processor sends group information to each accelerator in a node managed by the processor, where the group information includes information about an accelerator on each communication plane | S701 |

| The accelerator in each node performs intra-node data exchange, so that data obtained by one accelerator is data required by each accelerator that is located on a same communication plane as the accelerator | S702 |

| Each of the accelerators on the same communication plane performs inter-node data exchange through a second communication link, to obtain data required by each accelerator | S703 |

DATA TRANSMISSION SYSTEM AND METHOD, AND RELATED DEVICE

CROSS-REFERENCE TO RELATED APPLICATIONS

This is a continuation of International Patent Application No. PCT/CN2022/106309 filed on Jul. 18, 2022, which claims priority to Chinese Patent Application No. 202210073931.9 filed on Jan. 21, 2022. The disclosures of the aforementioned applications are hereby incorporated by reference in their entireties.

TECHNICAL FIELD

This disclosure relates to the field of computer technologies, and in particular, to a data transmission system and method, and a related device.

BACKGROUND

With development of computer technologies, a data scale is also developing continuously. To resolve a large-scale data computing problem, distributed computing emerges. During distributed computing, to resolve a problem of insufficient computing power, a task that requires a large amount of computing is allocated to a plurality of computing devices or chips for computing. During distributed computing, each computing device or chip generates data required by another computing device or chip, which involves data exchange between different computing devices or different chips. Therefore, improving efficiency of data transmission between different computing devices or different chips is an effective way to improve distributed computing efficiency.

SUMMARY

This disclosure discloses a data transmission system and method, and a related device, to reduce congestion and a transmission delay in a data transmission process, and improve data transmission efficiency.

According to a first aspect, this disclosure provides a data transmission system. The data transmission system includes a plurality of nodes, each of the plurality of nodes includes a plurality of accelerators, and the plurality of accelerators in each node are connected to each other through a first communication link. A plurality of communication planes is constructed between accelerators in the plurality of nodes, each communication plane includes one accelerator in each node, accelerators on any two communication planes are different from each other, and accelerators on a same communication plane are connected to each other through a second communication link. A first accelerator in a first node is configured to obtain first data sent by another accelerator in the first node. The first data includes data that needs to be sent by the other accelerator in the first node to a second accelerator in a second node. The first node and the second node are any two of the plurality of nodes. The first accelerator and the second accelerator are accelerators on a first communication plane. The first accelerator is further configured to send the first data to the second accelerator through the second communication link.

Because the plurality of communication planes are constructed between the accelerators in the plurality of nodes, when one or more accelerators in the first node need to send data to accelerators on the first communication plane, the one or more accelerators first send, through a communication link in the first node, the data to the first accelerator that belongs to the first node and the first communication plane, and then the first accelerator separately sends the data to the accelerators on the first communication plane through the second communication link. The foregoing method can reduce a quantity of times that accelerators in nodes send data to each other, reduce data congestion and a transmission delay on a network, and improve data transmission efficiency.

It should be noted that, when the other accelerator in the first node needs to send data to a plurality of accelerators on the first communication plane, the other accelerator in the first node can first send, to the first accelerator, all data that needs to be sent to the accelerators on the first communication plane, and then the first accelerator sends the received data to each accelerator on the first communication plane through the second communication link. For example, if the first node includes four accelerators, and the first communication plane includes six accelerators, the other three accelerators in the first node send, to the first accelerator, all data that needs to be sent to the six accelerators on the first communication plane, and then the first accelerator sends, to each of the other five accelerators through the second communication link, data that is in the received data and that is required by each of the other five accelerators on the first communication plane.

Because the plurality of communication planes are constructed between the accelerators in the plurality of nodes, when one or more accelerators in the first node need to send data to one or more accelerators on the first communication plane, the one or more accelerators first send, through a communication link in the first node, the data to the first accelerator that belongs to the first node and the first communication plane, and then the first accelerator sends data required by each accelerator on the first communication plane to each accelerator through the second communication link. The foregoing method can reduce a quantity of times that accelerators in nodes send data to each other, reduce data congestion and a transmission delay on a network, and improve data transmission efficiency.

In a possible implementation, the data transmission system further includes a processor, and the processor is configured to send group information to each accelerator in the plurality of nodes. The group information includes information about an accelerator on each communication plane.

In a possible implementation, the first accelerator is further configured to establish a connection of the second communication link to the second accelerator based on the received group information.

After determining the nodes used for computation that are included in the data transmission system, the processor can group the accelerators based on the accelerators in each node, to determine information about the accelerators on each communication plane, and notify the accelerators in each node, so that the accelerators in each node establish connections based on the foregoing group information.

In a possible implementation, the first accelerator is further configured to: when second data needs to be sent to any accelerator on a second communication plane, send the second data to a third accelerator in the first node. The third accelerator is an accelerator located on the second communication plane. The third accelerator is configured to send the second data to the any accelerator on the second communication plane through the second communication link.

It should be noted that, when the first accelerator and the other accelerator in this node need to send data to one or more accelerators on the second communication plane, the first accelerator and the other accelerator first send the data to the third accelerator, and then the third accelerator sends data required by each accelerator on the second communication plane to each accelerator through the second communication link. This reduces an inter-node communication scale, reduces data congestion and a transmission delay on a network, and improves data transmission efficiency.

In a possible implementation, the first accelerator is further configured to receive, through the second communication link, third data sent by each accelerator on the first communication plane. Data sent by one accelerator on the first communication plane to the first accelerator includes data that needs to be sent by a plurality of accelerators in a node in which the accelerator is located to the first accelerator.

In a possible implementation, the data transmission system is used for artificial intelligence (AI) model training, and the first data, the second data, and the third data are intermediate data generated during AI model training.

During AI model training, a plurality of accelerators in a plurality of nodes need to be used to process data, a large amount of data needs to be transmitted between different accelerators, and intermediate data generated during AI model training is transmitted by using the foregoing method. This can improve model training efficiency.

In a possible implementation, the first communication link includes a Peripheral Component Interconnect Express (PCIe) bus or a unified bus (UB), and the second communication link is a link that supports the Transmission Control Protocol (TCP), the Remote Direct Memory Access over Converged Ethernet (RoCE) protocol, or the InfiniBand (TB) protocol.

In a possible implementation, the plurality of nodes is deployed in one or more physical machines, and an accelerator in the plurality of nodes is a graphics processing unit (GPU), an embedded neural-network processing unit (NPU), a Tensor Processing Unit (TPU), or a deep learning processing unit (DPU).

According to a second aspect, this disclosure provides a data transmission method. The method is applied to a data transmission system including a plurality of nodes, each of the plurality of nodes includes a plurality of accelerators, and the plurality of accelerators in each node are connected to each other through a first communication link. A plurality of communication planes is constructed between accelerators in the plurality of nodes, each communication plane includes one accelerator in each node, accelerators on any two communication planes are different from each other, and accelerators on a same communication plane are connected to each other through a second communication link. The data transmission method includes:

A first accelerator in a first node obtains, through the first communication link, first data sent by another accelerator in the first node. The first data includes data that needs to be sent by the other accelerator in the first node to a second accelerator in a second node. Then, the first accelerator sends the first data to the second accelerator through the second communication link. The first node and the second node are any two of the plurality of nodes. The first accelerator and the second accelerator are accelerators on a first communication plane.

It should be noted that, when the other accelerator in the first node needs to send data to a plurality of accelerators on the first communication plane, the other accelerator in the first node can first send, to the first accelerator, all data that needs to be sent to the accelerators on the first communication plane, and then the first accelerator sends, to each accelerator on the first communication plane through the second communication link, data that is in the received data and that is required by each accelerator. For example, if the first node includes four accelerators, and the first communication plane includes six accelerators, the other three accelerators in the first node send, to the first accelerator, all data that needs to be sent to the six accelerators on the first communication plane, and then the first accelerator sends, to each of the other five accelerators through the second communication link, data that is in the received data and that is required by each of the other five accelerators on the first communication plane.

In a possible implementation, the first accelerator receives group information sent by a processor, and establishes a connection of the second communication link to the second accelerator based on the group information. The group information includes information about an accelerator on each communication plane.

In a possible implementation, the method further includes: when second data needs to be sent to any accelerator on a second communication plane, the first accelerator sends the second data to a third accelerator in the first node. The third accelerator is an accelerator located on the second communication plane. In this case, the third accelerator sends the second data to the any accelerator on the second communication plane through the second communication link.

It should be noted that, when the first accelerator needs to send data to a plurality of accelerators on the second communication plane, the first accelerator first sends the data to the third accelerator, and then the third accelerator sends data required by each accelerator on the second communication plane to each accelerator through the second communication link.

In a possible implementation, the first accelerator is further configured to receive, through the second communication link, third data sent by each accelerator on the first communication plane. Data sent by one accelerator on the first communication plane to the first accelerator includes data that needs to be sent by a plurality of accelerators in a node in which the accelerator is located to the first accelerator.

In a possible implementation, the data transmission system is used for AI model training, and the first data, the second data, and the third data are intermediate data generated during AI model training. During AI model training, a plurality of accelerators in a plurality of nodes need to be used to process data, a large amount of data needs to be transmitted between different accelerators, and intermediate data generated during AI model training is transmitted by using the foregoing method. This can improve model training efficiency.

In a possible implementation, the first communication link includes a PCIe bus or a UB, and the second communication link is a link that supports TCP, the RoCE protocol, or the IB protocol.

In a possible implementation, the plurality of nodes is deployed in one or more physical machines, and an accelerator in the plurality of nodes is a GPU, an NPU, a TPU, or a DPU.

According to a third aspect, this disclosure provides a card, and the card includes a plurality of accelerators configured to perform the method according to any one of the second aspect and the possible implementations of the second aspect.

According to a fourth aspect, this disclosure provides a computing device, including a processor, a memory, and a plurality of accelerators. The memory stores computer instructions. When the processor executes the computer instructions, the computing device invokes one or more accelerators to perform the method according to any one of the second aspect and the possible implementations of the second aspect.

According to a fifth aspect, this disclosure provides a computer-readable storage medium. The computer-readable storage medium stores a computer program. When the computer program is executed by an accelerator, the accelerator performs the method according to any one of the second aspect and the possible implementations of the second aspect.

BRIEF DESCRIPTION OF DRAWINGS

To describe technical solutions in embodiments of this disclosure more clearly, the following briefly introduces the accompanying drawings for describing embodiments. It is clear that the accompanying drawings in the following descriptions show merely some embodiments of this disclosure, and a person of ordinary skill in the art may still derive other drawings from these accompanying drawings without creative efforts.

FIG. 6 is a schematic flowchart of a data transmission method according to an embodiment of this disclosure.

FIG. 7 is a schematic flowchart of another data transmission method according to an embodiment of this disclosure.

DESCRIPTION OF EMBODIMENTS

The following describes technical solutions of this disclosure with reference to accompanying drawings.

In embodiments of this disclosure, "at least one" means one or more, and "a plurality of" means two or more. In addition, "and/or" describes an association relationship between associated objects, and represents that three relationships may exist. For example, A and/or B may represent the following cases: only A exists, both A and B exist, and only B exists, where A and B may be singular or plural. A character "/" generally indicates an "or" relationship between the associated objects. Any embodiment or design solution described by using "example" or "for example" in this disclosure shall not be construed as being more preferred or more advantageous than another embodiment or design solution. Exactly, use of the word "example", "for example", or the like is intended to present a related concept in a specific manner.

The following describes this disclosure in detail with reference to the accompanying drawings, and first describes special nouns in this disclosure.

AI chip: The AI chip is a module configured to process a large quantity of computing tasks in an AI application. One computing device may have one or more AI chips.

Network interface controller (NIC): The NIC is also referred to as a network interface card. The NIC is computer hardware configured to support communication between computing devices on a network. An NIC of a computing device is configured to: connect the computing device to another computing device, or establish a connection between the computing device and a network device such as a switch.

PCIe switch chip: The PCIe switch chip is a module configured to extend a PCIe link. The PCIe link uses an end-to-end connection manner, and each of two ends of one PCIe link can be connected to only one device or component. Therefore, the PCIe link may be extended by using the PCIe switch chip, so that one end of the PCIe link is connected to a plurality of devices or components. The PCIe switch chip is connected to another device or component through a PCIe bus.

The following first describes an internal structure of a computing device.

Figure 1:
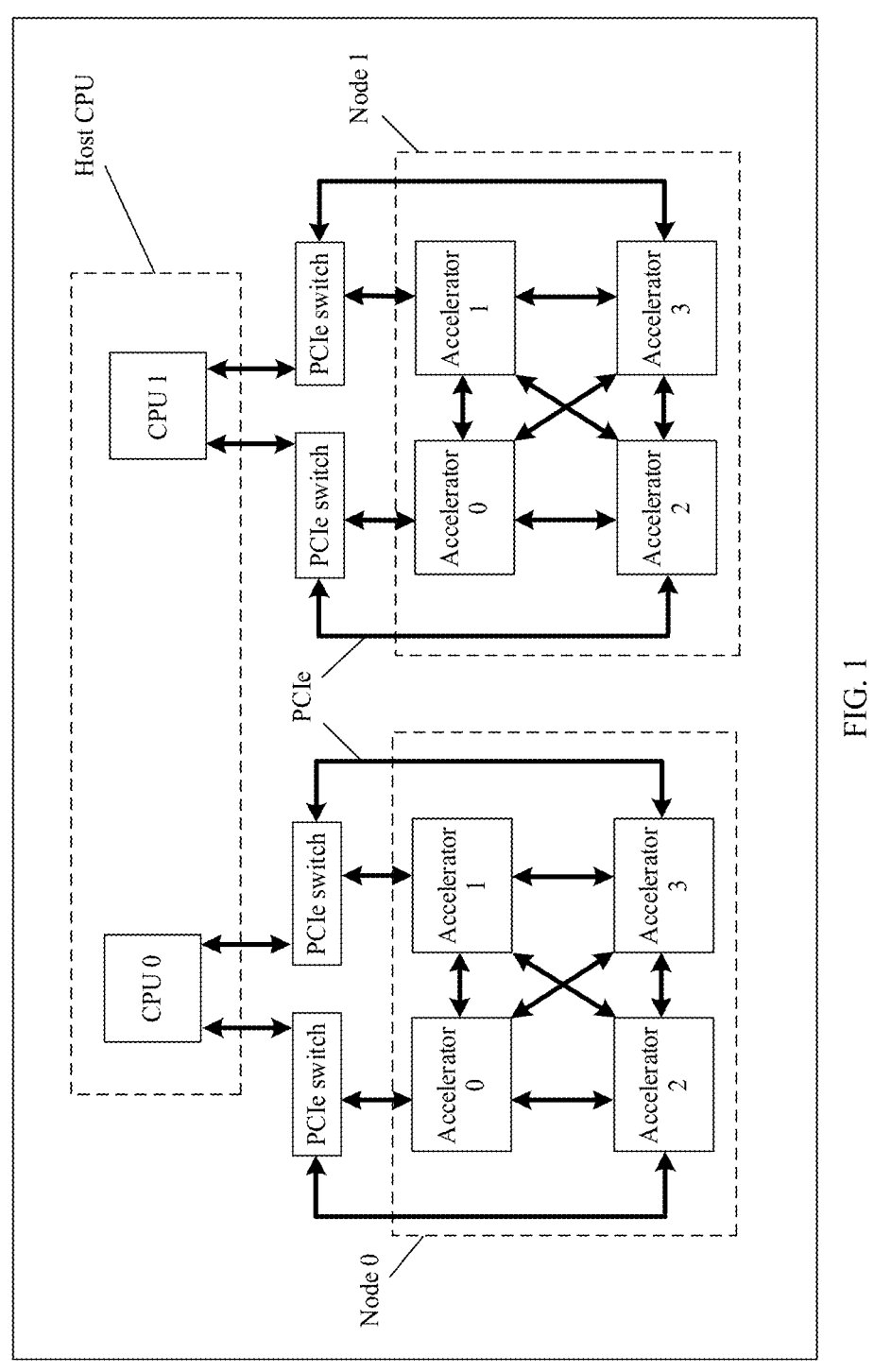
FIG. 1 is a schematic diagram of a structure of a computing device according to an embodiment of this disclosure.

FIG. 1 is a schematic diagram of a structure of a computing device according to an embodiment of this disclosure. The computing device includes at least one central processing unit (CPU) and at least one node, and each node includes a plurality of accelerators. As a host CPU, the CPU is connected to the accelerators in each node through a bus or through a bus and a switch chip. In FIG. 1, for example, one computing device includes two CPUs and two nodes, and each node includes four accelerators. One host CPU is separately connected to four accelerators in one node through a PCIe bus and a PCIe switch chip, and the four accelerators in the one node are connected through the PCIe bus. It should be noted that the computing device further includes components such as a memory and a network interface card that correspond to each accelerator. The foregoing accelerator may be any one of AI chips such as a GPU, an embedded NPU, a TPU, and a DPU.

Figure 2:
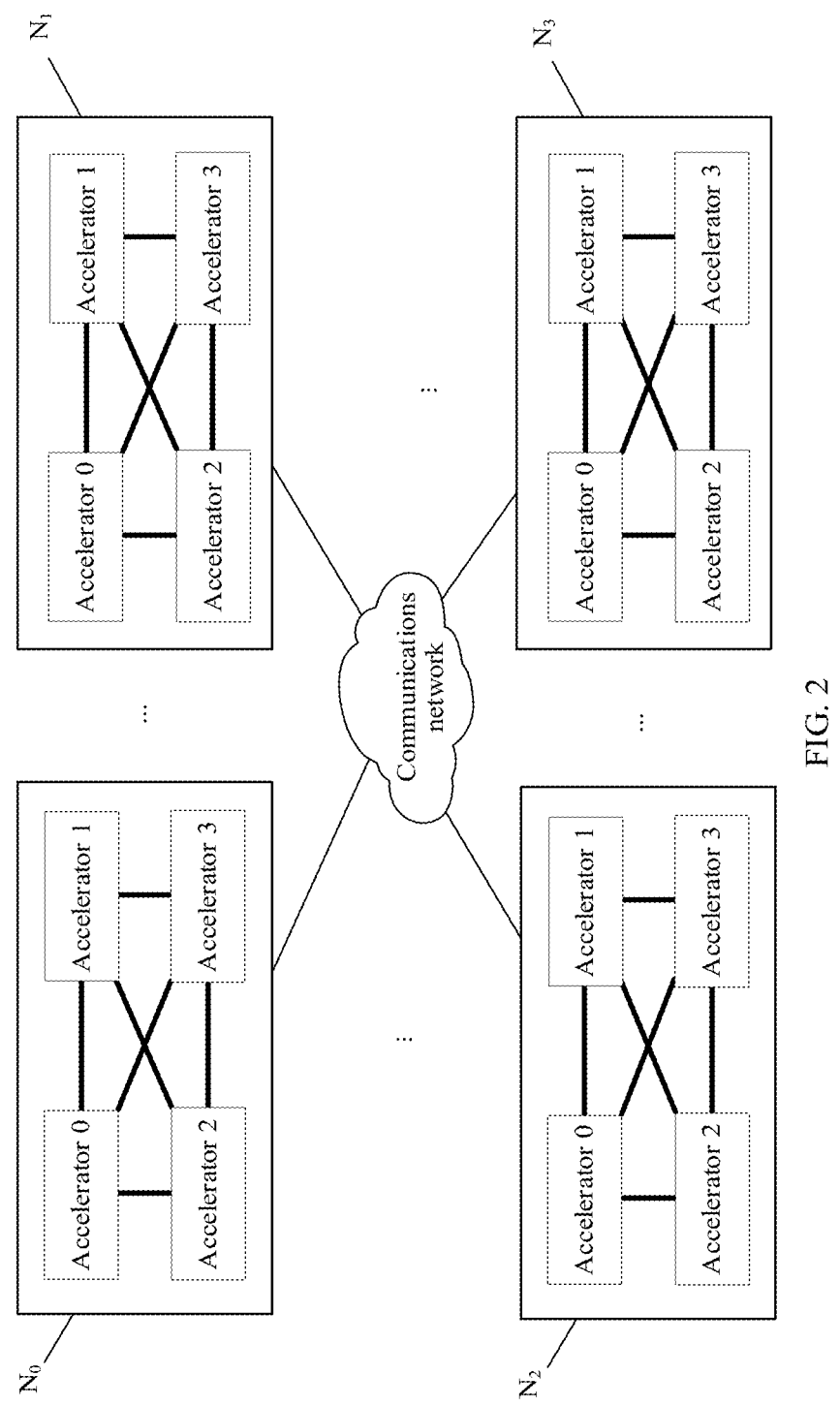
FIG. 2 is a schematic diagram of a node cluster according to an embodiment of this disclosure.

FIG. 2 is a schematic diagram of a node cluster. Each node in the node cluster includes a plurality of accelerators, and different nodes are connected to each other through a communications network. The plurality of nodes in the node cluster may be nodes in one computing device shown in FIG. 1, or may be nodes in different computing devices. When a plurality of node clusters is located in different computing devices, quantities of nodes in the different computing devices may be the same or may be different. In a process in which the node cluster performs computation, each accelerator generates data required by another accelerator. Therefore, the accelerator needs to send the data to the other accelerator that requires the data. When data generated by one accelerator is data required by accelerators in a same node, the accelerator can send the data to the accelerators in the node through an internal high-speed link. However, when each of a plurality of accelerators in one node generates data that needs to be sent to a target accelerator in another node, each of the plurality of accelerators needs to send the data to the target accelerator in the other node through the communications network. For example, when each of four accelerators in a node $N_0$ generates data required by an accelerator 0 in a node $N_2$, each of the four accelerators in the node $N_0$ needs to send the data to the accelerator 0 in the node $N_2$ through the communications network. When a plurality of accelerators in a plurality of nodes in the node cluster need to send data to each other, a communication scale in the communications network is relatively large. For example, each of the four accelerators in the node $N_0$ generates data required by four accelerators in a node $N_1$ and the four accelerators in the node $N_2$, and each of the four accelerators in the node $N_1$ also generates data required by the four accelerators in the node $N_0$ and the four accelerators in the node $N_2$. When the communication scale in the communications network is relatively large, network congestion is likely to be caused, and data transmission efficiency is reduced. In addition, the communication scale of the node cluster increases as a quantity of nodes increases, which is unfavorable to cluster expansion.

Figure 3:
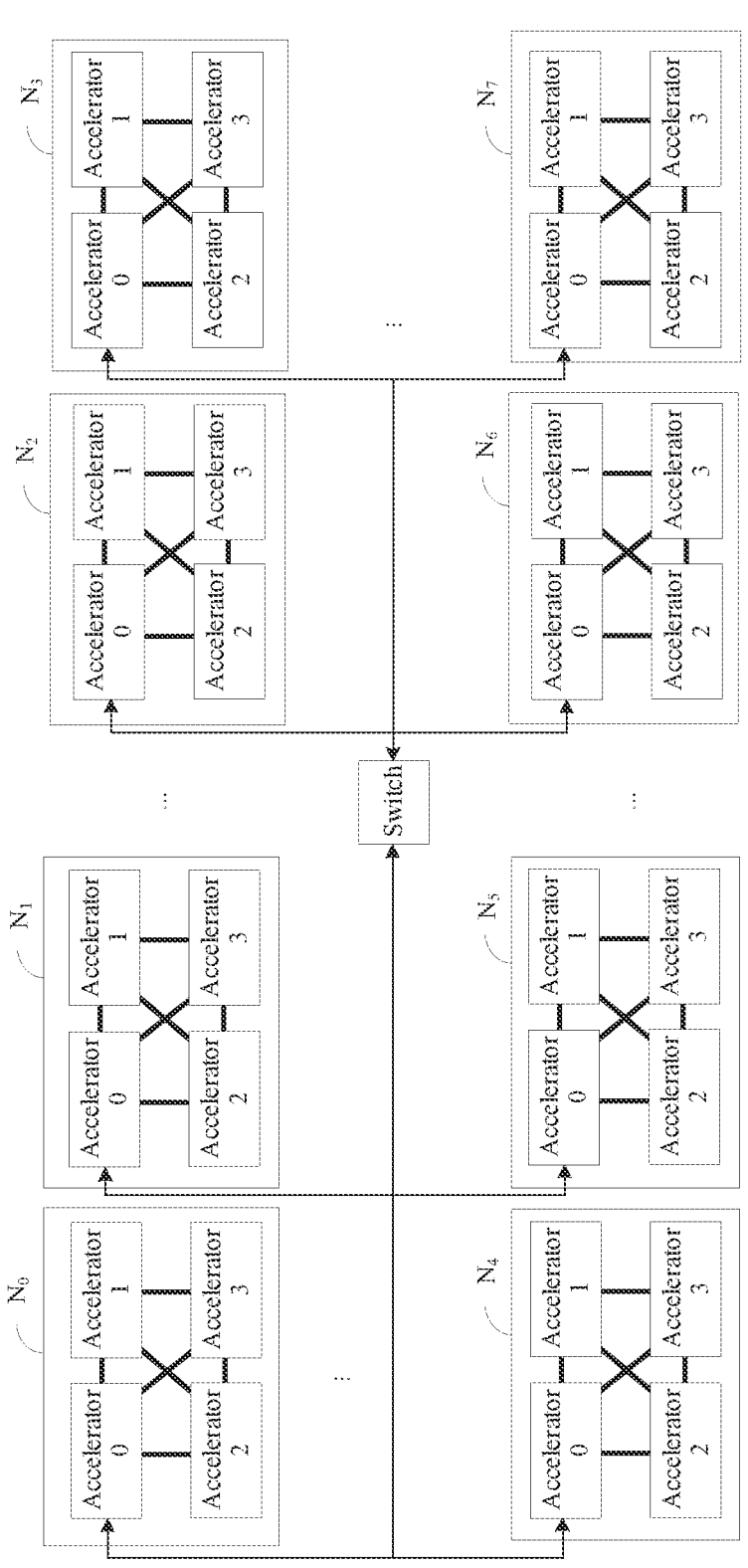
FIG. 3 is a schematic diagram of a data transmission system according to an embodiment of this disclosure.

An embodiment of this disclosure provides a data transmission method. The method is applied to a data transmission system including a plurality of nodes in FIG. 3, each of the plurality of nodes includes at least two accelerators, and the plurality of accelerators in each node are connected to each other through a first communication link. A plurality of communication planes is constructed between accelerators in the plurality of nodes, each communication plane includes one accelerator in each node, accelerators on any two communication planes are different from each other, and accelerators on a same communication plane are connected to each other through a second communication link. FIG. 3 shows a case in which accelerators (an accelerator 0 in each node) in only one communication plane are connected through the second communication link. The plurality of nodes may be nodes in one computing device, or may be nodes in a plurality of computing devices. A structure of the computing device is the computing device described in FIG. 1. When the plurality of nodes is located in one computing device, a plurality of accelerators in one node are connected through the first communication link, and can perform data exchange through the first communication link. Because accelerators in different nodes in one computing device are not connected to each other through the first communication link, the accelerators in the different nodes in the one computing device need to perform data exchange through the second communication link. When the plurality of nodes are nodes in a plurality of computing devices, accelerators in nodes in different computing devices are connected to each other through the second communication link. It should be noted that, when the plurality of nodes is located in a plurality of computing devices, quantities of nodes included in any two computing devices may be the same or may be different. In FIG. 3, for example, four accelerators in each node are connected through the first communication link. It should be understood that a quantity of accelerators that are connected through the first communication link in each node may alternatively be another quantity.

The first communication link includes a bus, for example, a PCIe bus or a UB. The first communication link may alternatively be a communications network including a bus and a switch chip, for example, a PCIe bus and a PCIe switch chip. The second communication link may be a link that supports TCP, the RoCE protocol, or the IB protocol, for example, an Ethernet or an IB network. Each accelerator corresponds to one network interface card, and accelerators in different nodes are connected through network devices such as a network interface card and a switch.

If the data transmission system includes n nodes $N_0$ to $N_{n-1}$, and each node includes m accelerators, the data transmission system includes m*n accelerators in total, where both m and n are integers greater than 1. In the n nodes in the data transmission system, one accelerator in each node is connected to one accelerator in each of the other nodes through the second communication link, to form a communication plane connected through the second communication link. In addition, each communication plane includes one accelerator in one node, and accelerators on any two communication planes are different. The foregoing data transmission system including the n nodes that each include the m accelerators includes m communication planes in total, and each communication plane includes n accelerators.

In a process in which the foregoing n nodes jointly complete a task, for example, perform neural network model training in a model parallelism manner, each accelerator generates data that needs to be sent to another accelerator. When one source accelerator in one node needs to send data to one or more destination accelerators, the one or more destination accelerators and the source accelerator may be located in a same node, or may be located in different nodes. In addition, when there is a plurality of destination accelerators, some of the plurality of destination accelerators and the source accelerator may be located in a same node, and some destination accelerators and the source accelerator may be located in different nodes. It should be noted that data sent by the source accelerator to all destination accelerators may be the same, or data sent to some destination accelerators may be the same, or data sent to all accelerators may be different from each other. This is not limited in this embodiment of this disclosure.

In this embodiment of this disclosure, to send data generated by each accelerator to a node that requires the data, the accelerators in each node first perform data exchange through the first communication link. A first accelerator in a first node in the data transmission system is used as an example. The first node is any node in the data transmission system, the first accelerator is any accelerator in the first node, and the first accelerator is located on a first communication plane of the data transmission system. When an accelerator in the first node needs to send data to an accelerator located on the first communication plane, the accelerator first sends, through the first communication link, the data to the first accelerator that is in the first node and that is located on the first communication plane. When the first accelerator and another accelerator in the first node need to send data to an accelerator located on a second communication plane, both the first accelerator and the other accelerator send the data to the accelerator that is in the first node and that is located on the second communication plane. The second communication plane is any communication plane in the data transmission system. Each accelerator in each node performs the foregoing intra-node data exchange operation. After each accelerator in each node completes the intra-node data exchange, each accelerator stores data required by each accelerator on a communication plane on which the accelerator is located. After each accelerator in each node completes the data exchange, the accelerators located on the same communication plane perform data exchange through the second communication link. Finally, each accelerator obtains data that needs to be sent by each accelerator in the data transmission system to the accelerator. It should be noted that the data sent by each accelerator includes indication information indicating a destination accelerator corresponding to the data, and the indication information may be an identifier or an address of the destination accelerator. For example, when an accelerator 1 in the node $N_0$ needs to send data to an accelerator 0 in the node $N_1$, the accelerator 1 in the node $N_0$ sends the data to an accelerator 0 in the node $N_0$. The data includes an address of the accelerator 0 in the node $N_1$.

For example, numbers of m accelerators in the node 0 are respectively $A_0$ to $A_{m-1}$, numbers of m accelerators in the node 1 are respectively $A_m$ to $A_{2m-1}$, and numbers of m accelerators in the node $N_k$ are respectively $A_{km}$ to $A_{(k+1)*m-1}$, where k is an integer less than or equal to n. The accelerators $A_0$, $A_m$, $A_{2m}$, $A_{km}$, . . . , and $A_{(n-1)m+1}$ are accelerators located on a same communication plane, and the accelerators $A_1$, $A_{m+1}$, $A_{2m+1}$, $A_{km+1}$, . . . , and $A_{(n-1)m+1}$ are accelerators located on a same communication plane. By analogy, the accelerators $A_{m-1}$, $A_{2m-1}$, $A_{3m-1}$, $A_{(k+1)m-1}$, . . . , and $A_{n*m-1}$ are accelerators located on a same communication plane.

Herein, (x, y) is used to represent data that needs to be sent by an accelerator $A_x$ to an accelerator $A_y$, where both x and y are integers greater than or equal to 0 and less than or equal to m*n. When each of m accelerators in one node $N_k$ needs to send data to other accelerators, for any accelerator $A_x$ in the node $N_k$, the data that needs to be sent by the accelerator to the other accelerators is (x, 0), (x, 1), (x, 2), . . . , and (x, n*m−1). The accelerator first sends each piece of data to a forwarding accelerator corresponding to each piece of data. The forwarding accelerator is located in the node $N_k$, and is located in an accelerator on a same communication plane as the destination accelerator. For example, $A_x$ sends, to the accelerator $A_{km}$, data to be sent to the destination accelerators $A_0$, $A_m$, $A_{2m}$, $A_{km}$, . . . , and $A_{(n-1)m}$, and sends, to the accelerator $A_{km+1}$, data that needs to be sent to the destination accelerators $A_1$, $A_{m+1}$, $A_{2m+1}$, $A_{km+1}$, . . . , and $A_{(n-1)m+1}$. By analogy, $A_x$ sends, to the accelerator $A_{(k+)*m-1}$, data that needs to be sent to the destination accelerators $A_{m-1}$, $A_{2m-1}$, $A_{3m-1}$, $A_{(k+1)m-1}$, . . . , and $A_{n*m-1}$. In addition, the accelerator $A_x$ receives data sent by another accelerator in the node $N_k$, and the data received by the accelerator $A_x$ is data that needs to be sent to an accelerator that is located on a same communication plane as $A_x$.

Any accelerator in the node $N_k$ performs the foregoing operations. Finally, data obtained by the any accelerator in the node $N_k$ is data required by n accelerators that are located on a same communication plane as the accelerator. For example, the accelerator $A_{km}$ needs to send data to $A_0$, $A_m$, $A_{2m}$, $A_{km}$, . . . , and $A_{(n-1)m}$, and the accelerator $A_{km+1}$ needs to send data to $A_1$, $A_{m+1}$, $A_{2m+1}$, $A_{km+1}$, . . . , and $A_{(n-1)m+1}$.

In addition, an accelerator in any node in the data transmission system performs the foregoing operations. After accelerators in each node complete intra-node data exchange, any accelerator obtains data required by n accelerators that are located on a same communication plane as the accelerator. For example, the accelerator $A_0$ needs to send data to $A_0$, $A_m$, $A_{2m}$, $A_{km}$, . . . , and $A_{(n-1)m}$, and the accelerator $A_1$ needs to send data to $A_1$, $A_{m+1}$, $A_{2m+1}$, $A_{km+1}$, . . . , and $A_{(n-1)m+1}$. Finally, each accelerator performs inter-node data exchange. Through the second communication link, each accelerator sends, to each accelerator that is located on a same communication plane as the accelerator, data required by the accelerator, to complete data exchange between the accelerators on the same communication plane. Finally, each accelerator obtains data that needs to be sent by each accelerator in the data transmission system to the accelerator. For example, the accelerator $A_0$ sends, to $A_m$ through the second communication link, data that needs to be sent to $A_m$, and the accelerator $A_0$ sends, to $A_{km}$ through the second communication link, data that needs to be sent to $A_{km}$. Finally, the accelerator $A_0$ obtains data that needs to be sent by each accelerator to $A_0$, and $A_{km}$ obtains data that needs to be sent by each accelerator to $A_{km}$.

Figure 4:
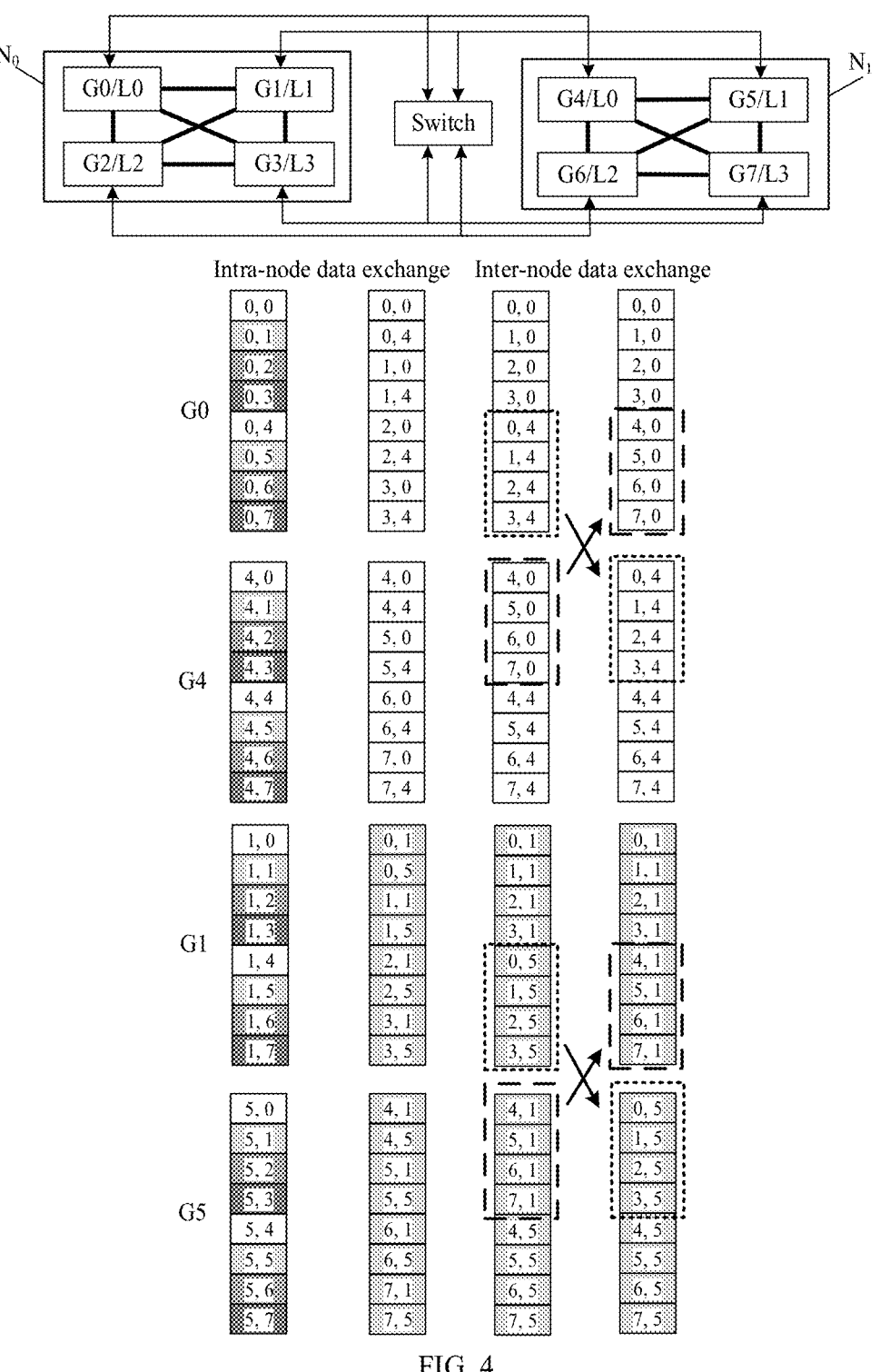
FIG. 4 is a schematic diagram of a data transmission process according to an embodiment of this disclosure.

An example in which an accelerator is a GPU and data transmission is performed between two nodes $N_0$ and $N_1$ is used below to describe in detail the data transmission method provided in this disclosure. FIG. 4 is a schematic diagram of data transmission according to an embodiment of this disclosure. FIG. 4 shows only a connection relationship between GPUs in a node and a connection relationship between GPUs on one communication plane. $N_0$ includes four GPUs in total: G0, G1, G2, and G3, and $N_1$ includes four GPUs in total: G4, G5, G6, and G7. The data transmission system includes four communication planes in total: L0, L1, L2, and L3. The communication plane L0 includes G0 and G4, the communication plane L1 includes G1 and G5, the communication plane L2 includes G2 and G6, and the communication plane L3 includes G3 and G7. Each GPU needs to send data to all the GPUs in the two nodes. For example, G0 needs to send data (0, 0), (0, 1), . . . , and (0, 7) to G0 to G7, and G1 needs to send data (1, 0), (1, 1), . . . , and (1, 7) to G0 to G7. By analogy, G7 needs to send data (7, 0), (7, 1), . . . , and (7, 7) to G0 to G7. That $N_0$ and $N_1$ first separately perform data exchange between the GPUs in each node includes: for any GPU in $N_0$ or $N_1$, for example, G0 in $N_0$, when one or more GPUs in $N_0$ need to send data to a GPU that is located on the communication plane L0, the one or more GPUs first send the data to G0 through the first communication link. When G0 needs to send data to a destination GPU on another communication plane, G0 first sends, through the first communication link, the data to a GPU that is in $N_0$ and that is located on a same communication plane as the destination GPU. For example, G0 receives the data (1, 0) and (1, 4) sent by G1, receives the data (2, 0) and (2, 4) sent by G2, and receives the data (3, 0) and (3, 4) sent by G3. G0 sends, to G1, both the data (0, 1) that needs to be sent to G1 and the data (0, 5) that needs to be sent to G5; G0 sends, to G2, both the data (0, 2) that needs to be sent to G2 and the data (0, 6) that needs to be sent to G6; and G0 sends, to G3, both the data (0, 3) that needs to be sent to G3 and the data (0, 7) that needs to be sent to G7.

Each GPU in $N_0$ and $N_1$ performs intra-node data exchange. After each GPU in each node completes the intra-node data exchange, data in the GPU is data required by each GPU that is located on a same communication plane as the GPU. As shown in FIG. 4, after the intra-node data exchange is completed, data in G0 is data required by G0 and G4, and includes the data (0, 0), (1, 0), (2, 0), (3, 0), (0, 4), (1, 4), (2, 4), and (3, 4); data in G1 is data required by G1 and G5, and includes the data (0, 1), (1, 1), (2, 1), (3, 1), (0, 5), (1, 5), (2, 5), and (3, 5); data in G4 is data required by G0 and G4, and includes the data (4, 0), (5, 0), (6, 0), (7, 0), (4, 4), (5, 4), (6, 4), and (7, 4); and data in G5 is data required by G1 and G5, and includes data (4, 1), (5, 1), (6, 1), (7, 1), (4, 5), (5, 5), (6, 5), and (7, 5).

After the GPU in each node completes the intra-node data exchange, GPUs that are located on a same communication plane perform inter-node data exchange through the second communication link, and each GPU sends data required by each of the other GPUs on the same communication plane to the corresponding GPU through the second communication link. G0 sends the data (0, 4), (1, 4), (2, 4), and (3, 4) to G4; G4 sends the data (4, 0), (5, 0), (6, 0), and (7, 0) to G0; G1 sends the data (0, 5), (1, 5), (2, 5), and (3, 5) to G5; and G5 sends the data (4, 1), (5, 1), (6, 1), and (7, 1) to G1. Data interaction of another communication plane is the same as the data interaction described above, and details are not described herein again. After the GPUs that are located on the same communication plane complete the data interaction, data in each GPU is data that needs to be sent by each GPU in the data transmission system to the GPU. For example, the data in G0 is (0, 0), (1, 0), (2, 0), (3, 0), (4, 0), (5, 0), (6, 0), and (7, 0), and the data in G5 is (0, 5), (1, 5), (2, 5), (3, 5), (4, 5), (5, 5), (6, 5), and (7, 5).

Figure 5:
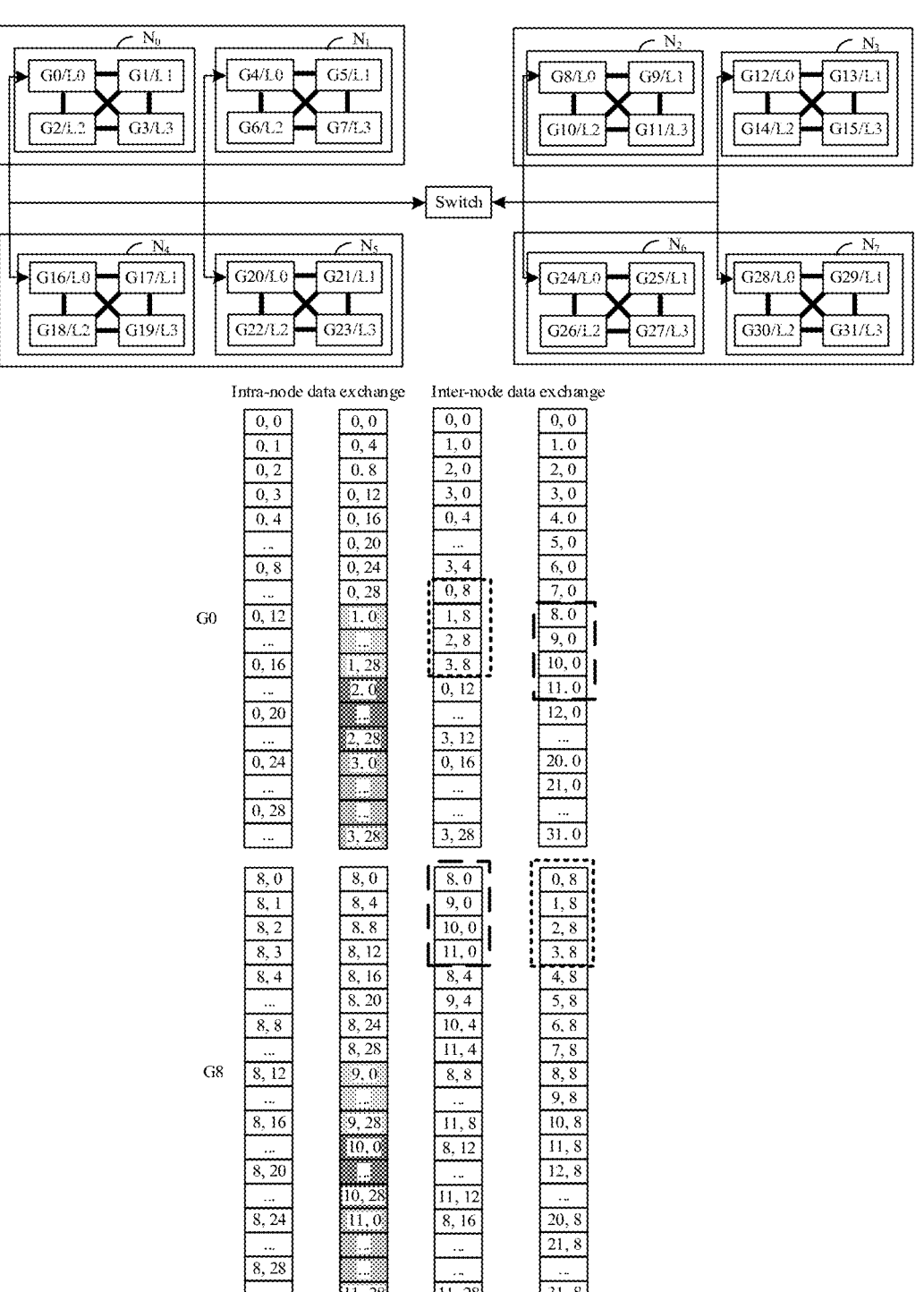
FIG. 5 is a schematic diagram of another data transmission process according to an embodiment of this disclosure.

An example of performing data transmission between two nodes is used above to describe the data transmission method provided in this embodiment of this disclosure. It should be understood that, in this embodiment of this disclosure, for a system including more than two nodes, data transmission can also be performed by using the foregoing method. An example in which an accelerator is a GPU and data transmission is performed between eight nodes $N_0$ to $N_8$ is used below to describe in detail the data transmission method provided in this disclosure. FIG. 5 is a schematic diagram of another data transmission according to an embodiment of this disclosure. The data transmission system includes four computing devices, each computing device includes two nodes, and each node includes four GPUs. In other words, the data transmission system includes 32 GPUs in total: G0 to G31. The data transmission system includes four communication planes in total. As shown in FIG. 5, the four communication planes are respectively L0, L1, L2, and L3. The communication plane L0 includes G0, G4, G8, G12, G16, G20, G24, and G28. The communication plane L1 includes G1, G5, G9, G13, G17, G21, G25, and G29. The communication plane L2 includes G2, G6, G10, G14, G18, G22, G26, and G30. The communication plane L3 includes G3, G7, G11, G15, G19, G23, G27, and G31. Each communication plane includes eight GPUs. FIG. 5 shows only a case in which the communication plane L0 is connected through the second communication link.

When each GPU in the data transmission system needs to send data to another GPU, data exchange is first performed between GPUs in a node. For the eight GPUs on the communication plane L0, G0 receives data sent by G1 to G3 in the node $N_0$ to each GPU on the communication plane L0. In addition, G0 sends, to G1, data that needs to be sent to each GPU on the communication plane L1; G0 sends, to G2, data that needs to be sent to each GPU on the communication plane L2; and G0 sends, to G3, data that needs to be sent to each GPU on the communication plane L3. Data exchange can also be performed between GPUs in another node according to the foregoing method. For example, G21 in the node $N_5$ receives data separately sent by G20, G22, and G23 to each GPU on the communication plane L1. In addition, G21 sends, to G20, data that needs to be sent to each GPU on the communication plane L0; G21 sends, to G22, data that needs to be sent to each GPU on the communication plane L2; and G21 sends, to G23, data that needs to be sent to each GPU on the communication plane L3.

After each GPU in each node completes the intra-node data exchange, data in the GPU is data required by each GPU that is located on a same communication plane as the GPU. For example, data in G0 is data required by each of the eight GPUs on the communication plane L0, data in G1 is data required by each of the eight GPUs on the communication plane L1, data in G4 is data required by each of the eight GPUs on the communication plane L0, and data in G6 is data required by each of the eight GPUs on the communication plane L2.

After each GPU in each node completes the intra-node data exchange, GPUs that are located on a same communication plane perform inter-node data exchange through the second communication link. Each GPU sends data required by another GPU on the same communication plane to the other GPU through the second communication link. G0 sends the data (0, 4), (1, 4), (2, 4), and (3, 4) to G4, sends the data (0, 8), (1, 8), (2, 8), and (3, 8) to G8, and sends the data (0, 12), (1, 12), (2, 12), and (3, 12) to G12, and so on. G4 sends the data (4, 0), (5, 0), (6, 0), and (7, 0) to G0, sends the data (4, 8), (5, 8), (6, 8), and (7, 8) to G8, and sends the data (4, 12), (5, 12), (6, 12), and (7, 12) to G12, and so on. G1 sends the data (0, 5), (1, 5), (2, 5), and (3, 5) to G5; G5 sends the data (4, 1), (5, 1), (6, 1), and (7, 1) to G1; and the like. Data interaction between GPUs on another communication plane is the same as the data interaction described above, and details are not described herein again. After the GPUs that are located on the same communication plane complete the inter-node data interaction, data in each GPU is data that needs to be sent by each GPU in the data transmission system to the GPU. For example, the data in G0 is (0, 0), (1, 0), (2, . . . , and (31, 0), and the data in G1 is (0, 1), (1, 1), (2, 1), . . . , and (31, 1).

FIG. 6 is a schematic flowchart of a data transmission method according to an embodiment of this disclosure. The data transmission method is applied to the data transmission system shown in FIG. 3. The data transmission method includes S601 and S602.

S601: A first accelerator obtains first data sent by another accelerator in a first node through a first communication link.

The first data includes data that needs to be sent by another accelerator in the first node to a second accelerator in a second node. The first node and the second node are any two of a plurality of nodes in the data transmission system. The first accelerator and the second accelerator are accelerators on a first communication plane.

In a process in which the foregoing n nodes jointly complete a task, for example, perform neural network model training in a model parallelism manner, each accelerator generates data that needs to be sent to another accelerator. One or more accelerators in the first node generate data that needs to be sent to the second accelerator in the second node. Through the first communication link, the one or more accelerators in the first node send, to the first accelerator that is located on a same communication plane as the second accelerator, the data that needs to be sent by each accelerator to the second accelerator. The data sent by each accelerator includes indication information for sending the data to the second accelerator, for example, an identifier of the second accelerator or an address of the second accelerator. The first node and the second node may be two nodes in a same computing device, or may be two nodes in different computing devices.

S602: The first accelerator sends the first data to the second accelerator through a second communication link.

After receiving the data that is sent by each accelerator in the first node and that needs to be sent to the second accelerator, the first accelerator obtains the first data, and then sends the first data to the second accelerator through the second communication link.

For a specific operation that the other accelerator in the first node sends, to the first accelerator in the first node, the data that needs to be sent to the second accelerator, refer to the operations related to intra-node data exchange in the embodiment corresponding to FIG. 4 or FIG. 5. For a specific operation that the first accelerator sends the data to the second accelerator through the second communication link, refer to the operations related to inter-node data exchange in the embodiment corresponding to FIG. 4 or FIG. 5. For example, the first node may be $N_0$ in FIG. 4, the second node is $N_1$ in FIG. 4, the first accelerator is G0 in FIG. 4, and the second accelerator is G4 in FIG. 4. A specific data exchange operation is not described herein again.

The method embodiment corresponding to FIG. 6 is described by using an example in which one accelerator in one of the two nodes receives data sent by another accelerator in a same node, and then sends the data to one accelerator in the other node through the second communication link. It should be understood that the data transmission method provided in this disclosure can be applied to each accelerator in each node in the data transmission system shown in FIG. 3. Each accelerator in each node can first perform intra-node data exchange through the first communication link, so that data obtained by any accelerator is data required by each accelerator that is located on a same communication plane as the accelerator. Then, the accelerator in each node performs data exchange with each accelerator on the same communication plane through the second communication link. Finally, each accelerator obtains the data required by each accelerator. FIG. 7 is a schematic flowchart of another data transmission method according to an embodiment of this disclosure. The data transmission method is applied to the data transmission system shown in FIG. 3. The data transmission method includes S701 to S703.

S701: A processor sends group information to each accelerator in a node managed by the processor, where the group information includes information about an accelerator on each communication plane.

The foregoing data transmission system includes n nodes and at least one host CPU. Each node includes m accelerators, and one host CPU manages at least one node. The group information includes the information about the accelerator on each communication plane in the data transmission system. The information about the accelerator may be an identifier or an address of the accelerator. For example, the data transmission system shown in FIG. 5 includes eight nodes, each node includes four GPUs, the data transmission system includes four communication planes, and each communication plane includes eight GPUs. In this case, the group information includes information about the eight GPUs on each communication plane. The accelerator in each node establishes, based on the foregoing group information, a connection of the second communication link to each of other accelerators that are located on a same communication plane.

S702: The accelerator in each node performs intra-node data exchange, so that data obtained by one accelerator is data required by each accelerator that is located on a same communication plane as the accelerator.

In a process in which the foregoing n nodes jointly complete a task, for example, perform neural network model training in a model parallelism manner, each accelerator generates data that needs to be sent to another accelerator. For example, one or more accelerators in the first node generate first data that needs to be sent to the second accelerator in the second node. The one or more accelerators in the first node determine, based on the foregoing group information, that the first accelerator in the first node and the second accelerator in the second node are located on a same communication plane. The one or more accelerators in the first node first send, to the first accelerator through the first communication link, the data that needs to be sent by each accelerator to the second accelerator. The data sent by each accelerator in the first node includes indication information for sending the data to the second accelerator, for example, an identifier of the second accelerator or an address of the second accelerator. The first node and the second node are any two different nodes in the data transmission system. The first node and the second node may be two nodes in a same computing device, or may be two nodes in different computing devices.

It should be noted that, when the other accelerator in the first node needs to send data to a plurality of accelerators on the first communication plane, the other accelerator in the first node can first send, to the first accelerator, data that needs to be sent to each accelerator on the first communication plane. For example, the first node includes four accelerators, the first communication plane includes six accelerators, and each of the other three accelerators in the first node sends, to the first accelerator, data that needs to be sent to the six accelerators on the first communication plane.

In a possible implementation, the first accelerator in the first node generates second data that needs to be sent to a fourth accelerator in the second node, and the first accelerator determines, based on the foregoing group information, that a third accelerator in the first node and the fourth accelerator are located on a same communication plane. In this case, the first accelerator sends the second data to the third accelerator, so that the third accelerator sends the second data to the fourth accelerator through the second communication link. The second data includes indication information for sending the second data to the fourth accelerator.

In this embodiment of this disclosure, after the accelerator in each node generates the data that needs to be sent to the other accelerator, the accelerator in each node performs data exchange between accelerators in the node through the first communication link. Finally, data obtained by one accelerator is data required by each accelerator that is located on a same communication plane as the accelerator. For a method for performing data exchange between accelerators in a node, refer to the operations related to intra-node data exchange in embodiments corresponding to FIG. 3 to FIG. 5. Details are not described herein again.

S703: Each of the accelerators on the same communication plane performs inter-node data exchange through the second communication link, to obtain data required by each accelerator.

After receiving the data that is sent by each of the other accelerators in the first node and that needs to be sent to the second accelerator, the first accelerator sends, to the second accelerator through the second communication link according to the indication information in the received data, the data that needs to be sent by each of the other accelerators to the second accelerator and the data that needs to be sent by the first accelerator to the second accelerator. Similarly, the third accelerator sends the second data to the fourth accelerator through the second communication link. The first accelerator also receives, through the second communication link, third data sent by each of the other accelerators on the first communication plane. The third data includes data sent by an accelerator in a node to which each accelerator on the first communication plane belongs to the first accelerator.

In this embodiment of this disclosure, after the accelerators in each node perform data exchange between the accelerators in the node through the first communication link, a memory of any accelerator stores data required by each accelerator on a communication plane on which the accelerator is located. Then, the accelerators located on the same communication plane perform inter-node data exchange through the second communication link. Finally, each accelerator obtains data required by each accelerator, that is, data that needs to be sent by each accelerator in the data transmission system to the accelerator. For a method in which accelerators located on a same communication plane perform inter-node data exchange, refer to the operations related to inter-node data exchange in embodiments corresponding to FIG. 3 to FIG. 5. Details are not described herein again.

According to the data transmission method provided in this embodiment of this disclosure, when accelerators in a plurality of nodes need to perform data exchange with each other, accelerators in each node first perform data exchange through a communication link in the node. After the accelerators in each node perform data exchange through first communication link in the node, data in any accelerator is data required by each accelerator that is located on a same communication plane as the accelerator, and the accelerators located on the same communication plane perform data exchange through the second communication link. Finally, each accelerator obtains data required by each accelerator. According to the data transmission method provided in this disclosure, an internal high-speed link in a node can be fully used to implement data aggregation on a same communication plane, and then data exchange is performed between accelerators in nodes through the second communication link. This can reduce a quantity of times that accelerators in nodes send data to each other, that is, reduce an inter-node communication scale, reduce data congestion and a transmission delay on a network, improve data transmission efficiency, and facilitate system expansion to enhance computing power. For example, in the embodiment corresponding to FIG. 4, when G0 to G3 in the node N$_0$ need to send data to G4 in the node N$_1$, G1 to G3 first send, to G0 through the first communication link in the node, the data that needs to be sent to G4, then G0 sends, to G4 through the second communication link, the data that needs to be sent by G0 to G3 to G4, and G0 to G3 do not need to separately send the data to G4 through the second communication link. This can reduce a quantity of times of inter-node communication to a quarter.

Figure 8:
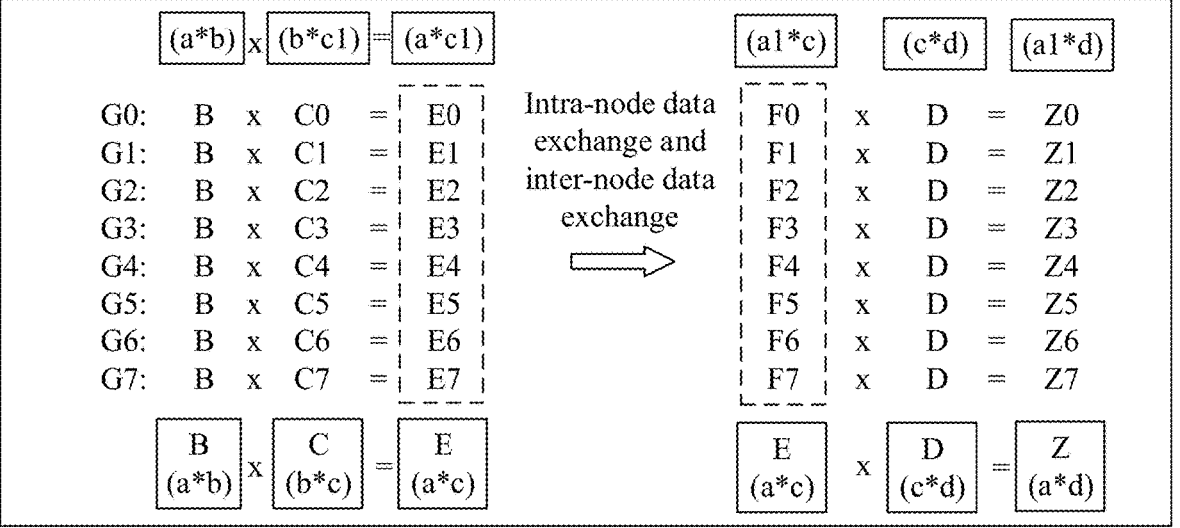
FIG. 8 is a schematic diagram of matrix computation according to an embodiment of this disclosure.

The data transmission method provided in this embodiment of this disclosure can be applied to a matrix operation, for example, a matrix operation in a neural network model training process. FIG. 8 is a schematic diagram of a matrix operation according to an embodiment of this disclosure. FIG. 8 is a schematic diagram of performing model training by using the data transmission system including two nodes and eight GPUs in FIG. 4. The eight GPUs complete matrix multiplication computation Z=(B×C)×D in the model training process. Herein, B is a matrix of a*b, C is a matrix of b*c, D is a matrix of c*d, and E=B×C. In this case, E is a matrix of a*c. When the foregoing matrix multiplication operation is performed, the matrix C has a relatively large amount of data. For example, the matrix C is an embedding table. The matrix C needs to be deployed in a plurality of GPUs, for example, deployed in eight GPUs in total: G0 to G7. The matrix C is divided into eight submatrices by column. If the matrix is evenly divided into eight submatrices by column, the submatrices C0 to C7 are all b*c1 matrices, where c1=c/8. As shown in FIG. 8, input data of the eight GPUs is the matrix B and one submatrix of the matrix C, that is, each GPU completes partial computation of matrix multiplication B*C. For example, G0 completes matrix computation of E0=B×C0, and G4 completes matrix computation of E4=B×C4.

As shown in FIG. 8, after each GPU completes the matrix multiplication computation, eight matrices E0 to E7 of a*c1 are obtained in each GPU. Then, each GPU needs to continue to cooperate to complete a matrix multiplication operation with the matrix D. Because the matrix D is a matrix of c*d, the matrices E0 to E7 cannot directly perform matrix multiplication computation with the matrix D, and the matrix in each GPU needs to be first converted into a matrix with c columns by using the foregoing method for performing data exchange between GPUs in each node and data exchange between GPUs in nodes on a same communication plane. A matrix E obtained by combining the matrices E0 to E7 is a matrix of a*c. Therefore, the matrix E may be divided into eight submatrices F0 to F7 by row. If the matrix E is evenly divided into eight submatrices by row, each submatrix is a1*c, where a1=a/8. Then, data exchange between GPUs in a node and data exchange between GPUs in nodes are performed, and the matrix in each GPU is converted into a matrix of a1*c, to complete the multiplication operation with the matrix D.

Figure 9:
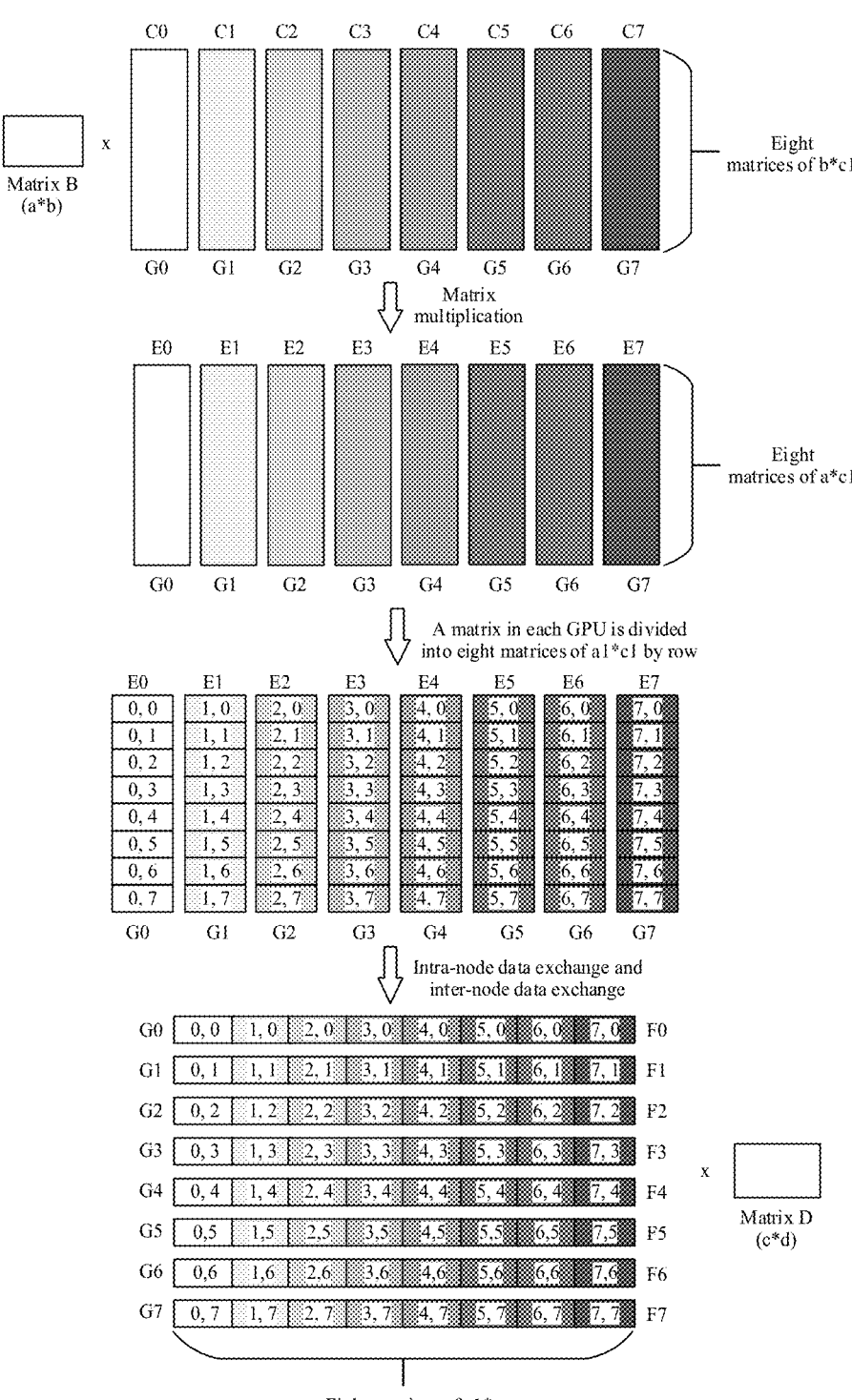
FIG. 9 is a schematic diagram of another matrix computation according to an embodiment of this disclosure.

According to the foregoing analysis, data exchange needs to be performed between the GPUs, to convert the matrices E0 to E7 of a*c1 into the matrices F0 to F7 of a1*c. For ease of description, the following uses an example in which a is equal to 200 and c is equal to 800. In this case, a1=25, c1=100, E is a 200*800 matrix, E0 to E7 are 200*100 matrices, and F0 to F7 are 25*800 matrices. As shown in FIG. 9, the matrix E0 in G0 is equivalent to columns 1 to 100 in the matrix E, the matrix E1 in G1 is equivalent to columns 101 to 200 in the matrix E, and the matrix E2 in G2 is equivalent to columns 201 to 300 in the matrix E. By analogy, the matrix E7 in G7 is equivalent to columns 701 to 800 in the matrix E. To convert the 200*100 matrix in each GPU into the 25*800 matrix, the matrix in each GPU is first divided into eight 25*100 matrices by row. If the matrix F0 finally obtained in G0 is data of rows 1 to 25 in the matrix E, G0 needs to receive data of rows 1 to 25 in each matrix in G1 to G7. If the matrix F1 finally obtained in G1 is data of rows 26 to 50 in the matrix E, G1 needs to receive data of rows 26 to 50 in each matrix in G0 and G2 to G7. If the matrix F2 finally obtained in G2 is data of rows 51 to 75 in the matrix E, G2 needs to receive data of rows 51 to 75 in each matrix in G0, G1, and G3 to G7. By analogy, if the matrix F7 finally obtained in G7 is data of rows 176 to 200 in the matrix E, G7 needs to receive data of rows 176 to 200 in each matrix in G0 to G6.

For G0, data of rows 1 to 25 in G0 is data required by G0, and is data sent by G0 to G0, which is equivalent to the data (0, 0) in the embodiment corresponding to FIG. 4. Data of rows 26 to 50 in G0 is data required by G1, and is data sent by G0 to G1, which is equivalent to the data (0, 1) in the embodiment corresponding to FIG. 4. By analogy, data of rows 176 to 200 in G0 is data required by G7, and is data sent by G0 to G7, which is equivalent to the data (0, 7) in the embodiment corresponding to FIG. 4. Therefore, G0 includes the data (0, 0), (0, 1), . . . , and (0, 7) sent to G0 to G7.

For G1, data of rows 1 to 25 in G1 is data required by G0, and is data sent by G1 to G0, which is equivalent to the data (1, 0) in the embodiment corresponding to FIG. 4. Data of rows 26 to 50 in G1 is data required by G1, and is data sent by G1 to G1, which is equivalent to the data (1, 1) in the embodiment corresponding to FIG. 4. By analogy, data of rows 176 to 200 in G1 is data required by G7, and is data sent by G1 to G7, which is equivalent to the data (1, 7) in the embodiment corresponding to FIG. 4. Therefore, G1 includes the data (1, 0), (1, 1), . . . , and (1, 7) sent to G0 to G7.

Similarly, G2 includes the data (2, 0), (2, 1), . . . , and (2, 7) sent to G0 to G7; G3 includes the data (3, 0), (3, 1), . . . , and (3, 7) sent to G0 to G7; G4 includes the data (4, 0), (4, 1), . . . , and (4, 7) sent to G0 to G7; G5 includes the data (5, 0), (5, 1), . . . , and (5, 7) sent to G0 to G7; G6 includes the data (6, 0), (6, 1), . . . , and (6, 7) sent to G0 to G7; and G7 includes the data (7, 0), (7, 1), . . . , and (7, 7) sent to G0 to G7. Data that needs to be sent by one GPU to another GPU is data of 25 rows and 100 columns.

According to the foregoing analysis, any GPU in G0 to G7 needs to send data of 25 rows and 100 columns to each GPU, and each GPU also needs to receive the data of 25 rows and 100 columns sent by each of the other GPUs, so that E0 in G0 can be converted into F0, E1 in G1 can be converted into F1, and so on. According to the method in the embodiment corresponding to FIG. 4, data in each of the eight GPUs is converted into each of matrices F0 to F7 of a1*c through data exchange between GPUs in a node and data exchange between GPUs in nodes on a same communication plane, and the matrix in each GPU completes the matrix multiplication operation with the matrix D, to obtain matrices Z0 to Z7 of a1*d.

For brief description, the foregoing method embodiments are all described as a combination of a series of actions. However, a person skilled in the art should understand that the present disclosure is not limited to the described action sequence. In addition, a person skilled in the art should also understand that all embodiments described in this specification are preferred embodiments, and the related actions are not necessarily mandatory to the present disclosure.

Another appropriate step combination that a person skilled in the art can think of based on the content described above also falls within the protection scope of the present disclosure. In addition, a person skilled in the art should also understand that all embodiments described in this specification are preferred embodiments, and the related actions are not necessarily mandatory to the present disclosure.

Figure 10:
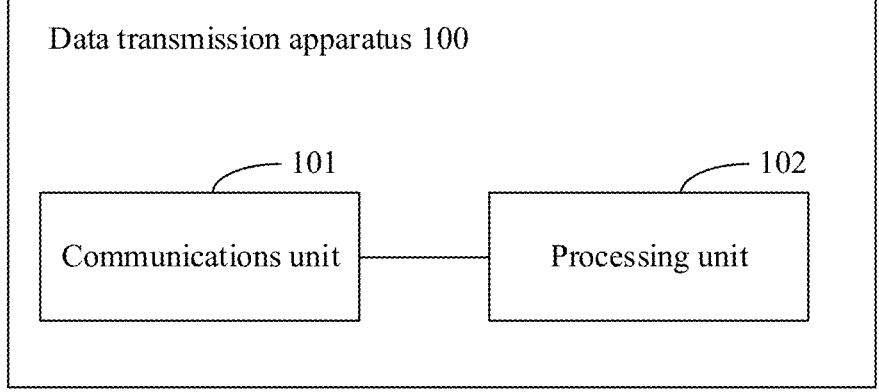
FIG. 10 is a schematic diagram of a structure of a data transmission apparatus according to an embodiment of this disclosure.
Figure 11:
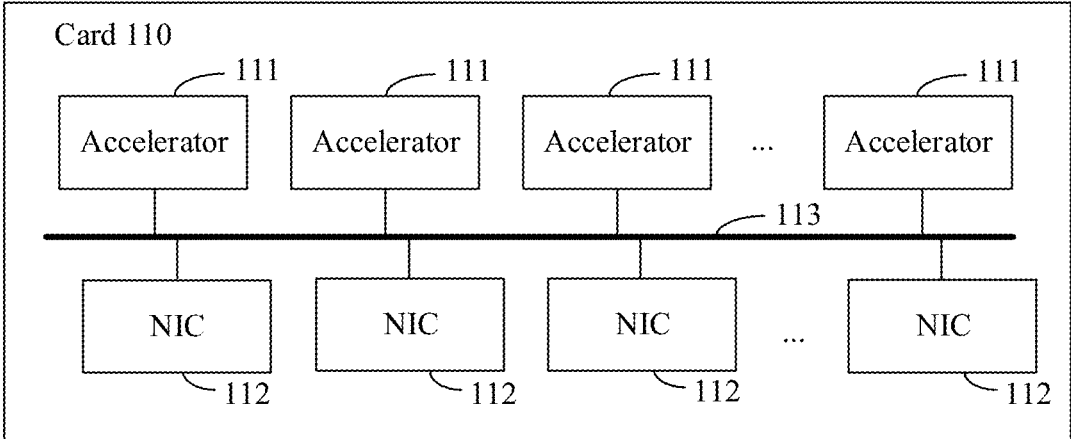
FIG. 11 is a schematic diagram of a structure of a card according to an embodiment of this disclosure.
Figure 12:
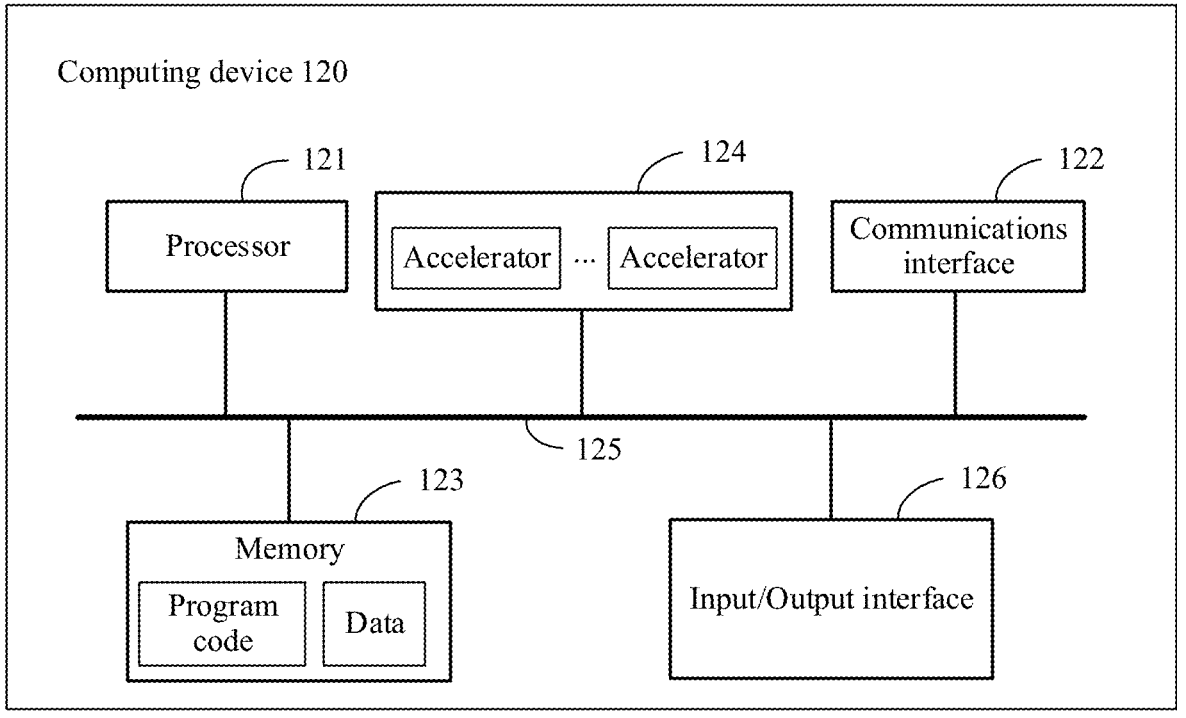
FIG. 12 is a schematic diagram of a structure of another computing device according to an embodiment of this disclosure.

With reference to FIG. 1 to FIG. 9, the foregoing describes in detail the data transmission system and method provided in embodiments of this disclosure. With reference to FIG. 10 to FIG. 12, the following describes a data transmission apparatus, a card, and a computing device that are provided in embodiments of this disclosure.

FIG. 10 is a schematic diagram of a structure of a data transmission apparatus according to an embodiment of this disclosure. The data transmission apparatus 100 is used for any accelerator in the foregoing data transmission system. The data transmission apparatus 100 includes a communications unit 101 and a processing unit 102.

The communications unit 101 is configured to obtain, through a first communication link, first data sent by another accelerator in a first node. The first data includes data that needs to be sent by the other accelerator in the first node to a second accelerator in a second node. The first node and the second node are any two of a plurality of nodes. The first accelerator and the second accelerator are accelerators on a first communication plane. For example, one or more accelerators in the first node generate first data that needs to be sent to the second accelerator in the second node. The one or more accelerators in the first node determine that the first accelerator in the first node and the second accelerator in the second node are located on a same communication plane. The one or more accelerators in the first node first send, to the first accelerator through the first communication link, the data that needs to be sent by each accelerator to the second accelerator. The data sent by the one or more accelerators in the first node includes indication information for sending the data to the second accelerator, for example, an identifier of the second accelerator or an address of the second accelerator.

The processing unit 102 is configured to: after the communications unit 101 of the first accelerator receives the data sent by the other accelerator in the first node, determine, based on the indication information in the data sent by each accelerator, a destination accelerator of the data sent by each accelerator, that is, the second accelerator, and then send, to the second accelerator by using the communications unit 101, the data to be sent by each accelerator to the second accelerator.

In a possible implementation, the processing unit 102 is further configured to: determine second data that needs to be sent to a fourth accelerator, and determine that a third accelerator in the first node and the fourth accelerator are located on a same communication plane; and the communications unit 101 is further configured to send the second data to the third accelerator in the first node through the first communication link, so that the third accelerator sends the second data to the fourth accelerator through a second communication link. The fourth accelerator is an accelerator located in a different node from the first accelerator, and the second data includes indication information for sending the second data to the fourth accelerator.

In a possible implementation, the communications unit 101 is further configured to receive data sent by another accelerator that is located on a same communication plane as the first accelerator.

For a specific operation of implementing data transmission by the data transmission apparatus 100, refer to an operation performed by any accelerator in embodiments described in FIG. 3 to FIG. 9. Details are not described herein again.

FIG. 11 is a schematic diagram of a structure of a card according to an embodiment of this disclosure. The card 110 includes a plurality of accelerators 111 and a plurality of NICs 112. Some or all of the plurality of accelerators 111 are connected through a first communication link. In other words, the card 110 includes one or more nodes described in embodiments corresponding to FIG. 3 to FIG. 5. A plurality of accelerators in each node are connected to each other through the first communication link, each accelerator 111 is connected to one NIC 112 through a bus 113, and one NIC 112 can be used by one or more accelerators 111 to send or receive data. The NIC 112 corresponding to each accelerator 111 is configured to send data to an accelerator 111 in another node, or receive data sent by an accelerator 111 in another node. The accelerator 111 may be any one of AI chips such as a GPU, an NPU, a TPU, and a DPU.

When one card 110 includes one of the foregoing nodes, the card 110 can be disposed in a computing device, and an accelerator 111 connected to the card 110 through the first communication link can complete all operations of intra-node data exchange described in embodiments corresponding to FIG. 3 to FIG. 9; and can also construct the second communication link in the foregoing method embodiments with a node on another card 110 in the computing device, so that accelerators 111 in a plurality of nodes on a plurality of cards 110 can complete all operations of inter-node data exchange described in embodiments corresponding to FIG. 3 to FIG. 9. When one card 110 includes a plurality of the foregoing nodes, the plurality of nodes on the card 110 can establish the second communication link described in the foregoing method embodiments, and an accelerator 111 connected to any node on the card 110 through the first communication link can complete all operations of intra-node data exchange described in embodiments corresponding to FIG. 3 to FIG. 9; and can also cooperate with an accelerator in another node on the card 110 to complete all operations of inter-node data exchange described in embodiments corresponding to FIG. 3 to FIG. 9, or cooperate with an accelerator in another node on another card 110 in the computing device to complete all operations of inter-node data exchange described in embodiments corresponding to FIG. 3 to FIG. 9.

For a specific operation of implementing data transmission by the card 110, refer to an operation performed by an accelerator in any node in embodiments described in FIG. 3 to FIG. 9. Details are not described herein again.

FIG. 12 is a schematic diagram of a computing device according to an embodiment of this disclosure. The computing device 120 includes one or more processors 121, a communications interface 122, a memory 123, and a plurality of accelerators 124. The processor 121, the communications interface 122, the memory 123, and the accelerator 124 are connected to each other through a bus 125. For a connection relationship between the processor 121 and the accelerator 124, refer to the descriptions in FIG. 1. A plurality of accelerators 124 can construct one or more nodes described in FIG. 3, and the plurality of accelerators 124 may be deployed on one or more cards 110 shown in FIG. 11.

For various operations performed by the processor 121, refer to the specific operations in S701 in FIG. 7. For a specific operation performed by any accelerator 124, refer to the operation performed by the accelerator in embodiments described in FIG. 3 to FIG. 9. For a relationship between the processor 121 and the accelerator 124, refer to related descriptions in FIG. 3. Details are not described herein again.

The processor 121 may have a plurality of specific implementation forms. For example, the processor 121 may be a CPU, and the processor 121 may be a single-core processor or a multi-core processor. The processor 121 may be a combination of a CPU and a hardware chip. The hardware chip may be an application-specific integrated circuit (ASIC), a programmable logic device (PLD), or a combination thereof. The PLD may be a complex programmable logic device (CPLD), a field-programmable logic gate array (FPGA), generic array logic (GAL), or any combination thereof. The processor 121 may alternatively be implemented independently by using a logic device with built-in processing logic, for example, an FPGA or a digital signal processor (DSP).

The accelerator 124 may be any one of AI chips such as a GPU, an NPU, a TPU, and a DPU.

The communications interface 122 may be a wired interface or a wireless interface, and is configured to communicate with another module or device. The wired interface may be an Ethernet interface or a Local Interconnect Network (LIN). The wireless interface may be a cellular network interface, a wireless local area network interface, or the like.

The memory 123 may be a nonvolatile memory, for example, a read-only memory (ROM), a programmable read-only memory (PROM), an erasable programmable read-only memory (EPROM), an electrically erasable programmable read-only memory (EEPROM), or a flash memory. The memory 123 may alternatively be a volatile memory. The volatile memory may be a random-access memory (RAM), and is used as an external cache. By way of example, and not limitation, many forms of RAMs may be used, for example, a static random-access memory (SRAM), a dynamic random-access memory (DRAM), a synchronous dynamic random-access memory (SDRAM), a double data rate synchronous dynamic random-access memory (DDR SDRAM), an enhanced synchronous dynamic random-access memory (ESDRAM), a synchronous link dynamic random-access memory (SLDRAM), and a direct Rambus random-access memory (DR RAM).

The memory 123 may also be configured to store program code and data, so that the processor 121 or the accelerator 124 invokes the program code stored in the memory 123, to perform the operation steps for implementing data transmission in the foregoing method embodiments. In addition, the computing device 120 may include more or fewer components than those shown in FIG. 12, or may have different component configuration manners.

The bus 125 may be a PCIe bus, an Extended Industry Standard Architecture (EISA) bus, a UB, a Compute Express Link (CXL), a cache coherent interconnect for accelerators (CCIX), or the like. The bus 125 may be classified into an address bus, a data bus, a control bus, and the like. In addition to a data bus, the bus 125 may further include a power bus, a control bus, a status signal bus, and the like. However, for clarity of description, only one bold line is used to represent the bus in FIG. 12, but this does not mean that there is only one bus or only one type of bus.

Optionally, the computing device 120 may further include an input/output interface 126. The input/output interface 126 is connected to an input/output device, and is configured to receive input information and output an operation result.

For specific implementations of performing various operations by the computing device 120, refer to specific operations in the method embodiments described in FIG. 2 to FIG. 9. Details are not described herein again.

An embodiment of this disclosure further provides a data transmission system. The system includes one or more computing devices 120. For a process of data exchange between accelerators in each computing device 120 in the system, refer to specific operations in the method embodiments described in FIG. 3 to FIG. 9. Details are not described herein again.

An embodiment of this disclosure further provides a computer-readable storage medium. The computer-readable storage medium stores instructions. When the instructions are run on a processor, the method steps in the foregoing method embodiments can be implemented. For specific implementations of performing the foregoing method steps by the processor of the computer-readable storage medium, refer to specific operations shown in the method embodiments described in FIG. 3 to FIG. 9 in the foregoing method embodiments. Details are not described herein again.

In embodiments above, the description of each embodiment has respective focuses. For a part that is not described in detail in an embodiment, refer to related descriptions in other embodiments.

All or some of embodiments may be implemented by using software, hardware, firmware, or any combination thereof. When the software is used to implement embodiments, all or some of embodiments may be implemented in a form of a computer program product. The computer program product includes one or more computer instructions. When the computer program instructions are loaded or executed on a computer, all or some of the procedures or functions according to embodiments of the present disclosure are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium, or a semiconductor medium. The semiconductor medium may be a solid-state drive (SSD).

Steps in the methods in embodiments of this disclosure may be sequentially scheduled, combined, or deleted according to an actual requirement. Modules in the system in embodiments of this disclosure may be divided, combined, or deleted according to an actual requirement.

Embodiments of this disclosure are described in detail above. The principles and implementations of this disclosure are described herein through specific examples. The descriptions about embodiments are merely provided to help understand the methods and core ideas of this disclosure. In addition, a person of ordinary skill in the art can make variations and modifications to this disclosure in terms of the specific implementations and application scopes according to the ideas of this disclosure. Therefore, the content of this specification shall not be construed as a limitation to this disclosure.

What is claimed is:

1. A system, comprising:
a first node comprising:
  a first accelerator located on a first communication plane of the system and configured to send first data; and
  a second accelerator located on a second communication plane of the system, interconnected to the first accelerator through a first communication link, and configured to:
    receive, from the first accelerator and through the first communication link, the first data; and
    send the first data; and
a second node comprising:
  a third accelerator located on the second communication plane of the system and configured to receive, from the second accelerator and through a second communication link, the first data, wherein a first data transmission speed of the first communication link is higher than a second data transmission speed of the second communication link; and
  a fourth accelerator located on the first communication plane of the system, wherein the second accelerator is further configured to:
  aggregate, from all accelerators on the second node, second data to be sent to the fourth accelerator; and
  send, to the first accelerator, based on the first accelerator being located on the same first communication plane of the system as the fourth accelerator, and after all intra-node data exchange is completed on the second node, the second data to be sent to the fourth accelerator, and wherein the first accelerator is further configured to:
  receive, from the second accelerator, the second data; and
  send, to the fourth accelerator, the second data.

2. The system of claim 1, wherein the first node further comprises a fifth accelerator, wherein the fifth accelerator is configured to send, to the second accelerator and through the first communication link, third data to be sent to the third accelerator, and wherein the second accelerator is further configured to send, to the third accelerator and through the second communication link, a first data set comprising the first data and the third data.

3. The system of claim 1, wherein the first node further comprises a fifth accelerator, wherein the fifth accelerator is configured to send, to the first accelerator and through the first communication link, third data to be sent to the fourth accelerator, wherein the first accelerator is further configured to send, to the fourth accelerator and through the second communication link, a first data set, and wherein the first data set comprises the second data and the third data.

4. The system of claim 1, wherein the first node and the second node are configured to perform neural network model training in a model parallelism manner.

5. The system of claim 1, wherein the first node and the second node are located in different computing devices.

6. The system of claim 1, wherein the first accelerator, the second accelerator, the third accelerator, and the fourth accelerator comprise a graphics processing unit (GPU), a neural-network processing unit (NPU), or a Tensor Processing Unit (TPU).

7. The system of claim 1, wherein the second accelerator is further configured to receive, from a processor, group information indicating which accelerators are on each communication plane in the system.

8. The system of claim 7, wherein the second accelerator is further configured to identify, based on the group information, that the first accelerator is located on the same first communication plane of the system as the fourth accelerator.

9. The system of claim 8, wherein the group information comprises addresses of the accelerators, and wherein the second accelerator is configured to identify that the first accelerator is located on the same first communication plane of the system as the fourth accelerator based on the addresses of the accelerators.

10. A system, comprising:
a first computing device comprising a first node, wherein the first node comprises:
  a first accelerator located on a first communication plane of the system and configured to send first data; and
  a second accelerator located on a second communication plane of the system, interconnected to the first accelerator through a first communication link, and configured to:
    receive, from the first accelerator and through the first communication link, the first data; and
    send the first data; and
a second computing device comprising a second node, wherein the second node comprises:
  a third accelerator located on the second communication plane of the system and configured to receive, from the second accelerator and through a second communication link, the first data, wherein a first data transmission speed of the first communication link is higher than a second data transmission speed of the second communication link; and a fourth accelerator located on the first communication plane of the system, wherein the second accelerator is further configured to:

aggregate, from all accelerators on the second node, second data to be sent to the fourth accelerator; and send, to the first accelerator, based on the first accelerator being located on the same first communication plane of the system as the fourth accelerator, and after all intra-node data exchange is complete on the second node, the second data to be sent to the fourth accelerator, and wherein the first accelerator is further configured to:

receive, from the second accelerator, the second data; and send, to the fourth accelerator, the second data.

11. The system of claim 10, wherein the first node further comprises a fifth accelerator, wherein the fifth accelerator is configured to send, to the second accelerator and through the first communication link, third data to be sent to the third accelerator, and wherein the second accelerator is further configured to send, to the third accelerator and through the second communication link, a first data set comprising the first data and the third data.

12. The system of claim 10, wherein the first node further comprises a fifth accelerator, wherein the fifth accelerator is configured to send, to the first accelerator and through the first communication link, third data to be sent to the fourth accelerator, wherein the first accelerator is further configured to send, to the fourth accelerator and through the second communication link, a first data set, and wherein the first data set comprises the second data and the third data.

13. The system of claim 10, wherein the first node and the second node perform neural network model training in a model parallelism manner.

14. The system of claim 10, further comprising a network interface card, wherein the second accelerator corresponds to the network interface card, and wherein the second accelerator is further configured to send, to the network interface card, the first data for the network interface card to send the first data to the third accelerator.

15. The system of claim 14, wherein the network interface card is configured to send, to the third accelerator and by using a switch between the first computing device and the second computing device, the first data.

16. The system of claim 10, wherein the first computing device further comprises a central processing unit (CPU), and wherein the CPU is configured to manage the first node.

17. The system of claim 10, wherein the second accelerator is further configured to receive, from a processor, group information indicating which accelerators are on each communication plane in the system.

18. The system of claim 17, wherein the second accelerator is further configured to identify, based on the group information, that the first accelerator is located on the same first communication plane of the system as the fourth accelerator.

19. The system of claim 18, wherein the group information comprises addresses of the accelerators, and wherein second accelerator is configured to identify that the first accelerator is located on the same first communication plane of the system as the fourth accelerator based on the addresses of the accelerators.

20. A method, comprising:

sending, by a first accelerator in a first node, first data to a second accelerator in the first node through a first communication link;

sending, by the second accelerator, the first data to a third accelerator in a second node through a second communication link, wherein a first data transmission speed of the first communication link is higher than a second data transmission speed of the second communication link;

aggregating, from all accelerators on the second node, second data to be sent to a fourth accelerator;

sending, by the second accelerator, to the first accelerator, based on the first accelerator being located on a same first communication plane as the fourth accelerator in the second node, and after all intra-node data exchange is completed on the second node, the second data to be sent to the fourth accelerator;

receiving, by the first accelerator and from the second accelerator, the second data; and sending, by the first accelerator and to the fourth accelerator, the second data.

21. The method of claim 20, further comprising sending, by a fifth accelerator in the first node, to the second accelerator, and through the first communication link, third data to be sent to the third accelerator, wherein sending the first data comprises sending, to the third accelerator and through the second communication link, a first data set comprising the first data and the third data.

22. The method of claim 20, further comprising sending, by a fifth accelerator in the first node, to the first accelerator, and through the first communication link, third data to be sent to the third accelerator, wherein sending the second data comprises sending, by the first accelerator, to the fourth accelerator, and through the second communication link, a first data set, and wherein the first data set comprises the second data and the third data.

23. The method of claim 20, further comprising performing, by the first node and the second node, neural network model training in a model parallelism manner.

24. The method of claim 20, wherein sending the first data comprises sending, by the second accelerator, the first data to a network interface card corresponding to the second accelerator for the network interface card to send the first data to the third accelerator.

25. The method of claim 20, further comprising receiving, by the second accelerator and from a processor, group information indicating which accelerators are on each communication plane in a system.

26. The method of claim 25, further comprising identifying, by the second accelerator and based on the group information, that the first accelerator is located on the same first communication plane of the system as the fourth accelerator.

27. The method of claim 26, wherein the group information comprises addresses of the accelerators, and wherein the method further comprises identifying, by the second accelerator, that the first accelerator is located on the same first communication plane of the system as the fourth accelerator based on the addresses of the accelerators.

* * * * *